United States Patent
Summer et al.

(10) Patent No.: US 11,247,737 B2
(45) Date of Patent: Feb. 15, 2022

(54) UGV WITH ADAPTIVE STABILIZER

(71) Applicant: Eagle Technology, LLC, Melbourne, FL (US)

(72) Inventors: Matthew D. Summer, Melbourne, FL (US); Paul M. Bosscher, West Melbourne, FL (US); Michael E. Bowman, Satellite Beach, FL (US); Sean J. Irvin, Grant-Valkaria, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 646 days.

(21) Appl. No.: 15/960,112

(22) Filed: Apr. 23, 2018

(65) Prior Publication Data

US 2019/0322326 A1 Oct. 24, 2019

(51) Int. Cl.
*B62D 57/032* (2006.01)
*B25J 5/00* (2006.01)
(Continued)

(52) U.S. Cl.
CPC ............ *B62D 57/032* (2013.01); *B25J 5/005* (2013.01); *B62D 55/065* (2013.01);
(Continued)

(58) Field of Classification Search
CPC .... B62D 55/075; B62D 57/02; B62D 57/022; B62D 57/024; B62D 57/028;
(Continued)

(56) References Cited

U.S. PATENT DOCUMENTS

| | | | | |
|---|---|---|---|---|
| 5,570,992 A | * | 11/1996 | Lemelson | ............... B25J 9/1015 414/744.3 |
| 7,348,747 B1 | * | 3/2008 | Theobold | ................. B25J 5/005 318/568.11 |

(Continued)

FOREIGN PATENT DOCUMENTS

WO 2010068198 A1 6/2010

OTHER PUBLICATIONS

Kovacic, Z., et al., "Design and control of a four-flipper tracked exploration & inspection robot," 21st Mediterranean Conference on Control and Automation, pop. 7-12, 2013.
(Continued)

*Primary Examiner* — Tony H Winner
*Assistant Examiner* — Maurice L Williams
(74) *Attorney, Agent, or Firm* — Fox Rothschild LLP; Robert J. Sacco; Carol E. Thorstad-Forsyth (57) ABSTRACT

Unmanned ground vehicle (UGV) includes a rotary joint having an axis of rotation. A rotary joint actuator is responsive to at least one control signal and is configured to cause a rotatable portion of the rotary joint to rotate relative to the vehicle chassis about the rotary joint axis of rotation. A stabilizer flipper having an elongated length is attached to the rotatable portion. Consequently, rotation of the rotatable portion about the rotary joint axis of rotation results in a change of orientation of the stabilizer flipper relative to the chassis. This change in orientation can range between a lateral direction and an longitudinal direction with respect to the vehicle chassis.

24 Claims, 7 Drawing Sheets

(51) Int. Cl.
*B62D 55/075* (2006.01)
*B25J 11/00* (2006.01)
*B62D 55/065* (2006.01)

(52) U.S. Cl.
CPC ......... *B62D 55/075* (2013.01); *B25J 11/0025* (2013.01); *G05B 2219/45066* (2013.01); *G05D 2201/0207* (2013.01)

(58) Field of Classification Search
CPC . B62D 57/032; B25J 5/005; B25J 9/02; B25J 9/046; B25J 9/10; B25J 11/002; B25J 11/0025; B25J 13/08; B25J 13/089; G05D 2201/0207; G05B 2219/45066
See application file for complete search history.

(56) References Cited

U.S. PATENT DOCUMENTS

| | | | | |
|---|---|---|---|---|
| 8,185,241 | B2* | 5/2012 | Jacobsen | B62D 55/0655 700/250 |
| 8,317,555 | B2* | 11/2012 | Jacobsen | B63C 11/34 440/12.63 |
| 8,360,178 | B2* | 1/2013 | Goldenberg | B25J 5/005 180/9.1 |
| 8,800,695 | B2 | 8/2014 | Couture et al. | |
| 9,248,875 | B2 | 2/2016 | Wolf et al. | |
| 9,488,449 | B2* | 11/2016 | Opperman | F41H 11/18 |
| 9,827,677 | B1* | 11/2017 | Gilbertson | B25J 15/0014 |
| 10,000,188 | B2* | 6/2018 | Bosscher | B62D 55/06 |
| 10,471,589 | B2* | 11/2019 | Meeker | B62D 55/084 |
| 2008/0281468 | A1* | 11/2008 | Jacobsen | B62D 55/075 700/246 |
| 2008/0296853 | A1* | 12/2008 | Langford | B25J 5/005 280/5.22 |
| 2010/0158656 | A1* | 6/2010 | Seavey | B25J 5/005 414/744.5 |
| 2013/0231779 | A1 | 9/2013 | Purkayastha et al. | |
| 2014/0031977 | A1* | 1/2014 | Goldenberg | B25J 5/005 700/245 |
| 2014/0110183 | A1* | 4/2014 | Rudakevych | B60L 50/66 180/9.32 |
| 2015/0122293 | A1* | 5/2015 | DesOrmeaux | B66C 23/166 134/21 |

OTHER PUBLICATIONS

Ohno, K., et al., "Semi-autonomous control system of rescue crawler robot having flippers for getting over unknown-steps," 2007 International Conference on Intelligent Robots and Systems, pp. 3012-3018.

* cited by examiner

UGV WITH ADAPTIVE STABILIZER

BACKGROUND

Statement of the Technical Field

The technical field of this disclosure comprises robotic systems, and more particularly concerns unmanned ground vehicles.

Description of the Related Art

Unmanned ground vehicles (UGVs) are being used for an increasing number of tasks, including those involving explosive ordinance disposal (EOD), handling of chemical, biological, radiological, nuclear, and explosive (CBRNE) materials, and other activities involving hazardous materials (HAZMAT). Consequently, mission objectives for UGVs can involve numerous operational requirements, many of which can be conflicting in nature.

For example, UGVs should be highly mobile to facilitate climbing climb stairs and traversing obstacles, but they also need to be small enough to fit into tight areas (e.g. down the aisle of an aircraft or charter bus). UGVs also need a long/strong robotic manipulator arm to access areas and lift heavy objects. Such manipulator arm may be needed for tasks which involve reaching up, forward and/or sideways. UGVs which are used for EOD may also need to be able to fire disruptors that produce large impulse forces on a robotic manipulator arm mounted on the UGV. The UGV also needs stability to be able to do all of the foregoing without tipping over. Conventional UGVs are often able to achieve satisfy some of these requirements, but these capabilities often come at the expense of satisfying other capabilities. Consequently, small to medium size robots often struggle to achieve even three of the foregoing requirements with any substantial degree of success.

SUMMARY

This document concerns an unmanned ground vehicle (UGV). The UGV includes a vehicle chassis which extends in a longitudinal direction from a vehicle rear to a vehicle front and in lateral directions from a vehicle centerline to two opposing lateral sides. A rotary joint is mounted to the vehicle chassis. The rotary joint has a rotary joint axis of rotation aligned transverse to both the longitudinal direction and the lateral directions. A rotary joint actuator is responsive to at least one control signal and is configured to cause a rotatable portion of the rotary joint to rotate relative to the vehicle chassis about the rotary joint axis of rotation. A stabilizer flipper having an elongated length is attached to the rotatable portion. Consequently, rotation of the rotatable portion about the rotary joint axis of rotation results in a change of orientation of the stabilizer flipper relative to the chassis. In some scenarios, the elongated length of the stabilizer flipper is traversed by a first leg and a second leg which are disposed on opposing sides of the robotic arm.

According to one aspect, the stabilizer flipper is attached to the rotatable portion by a pivot joint. The pivot joint is configured to facilitate a pivoting of the stabilizer flipper about a pivot joint axis of rotation that is aligned transverse to the rotary joint rotation axis. As such, the stabilizer flipper can be attached to the pivot joint at a first end of the stabilizer flipper and can include a foot, which defines a flipper contact surface, disposed at a second end of the stabilizer flipper, opposed from the first end. A flipper actuator is provided that is responsive to at least one control signal. The flipper actuator can cause the stabilizer flipper to pivot about the pivot joint axis from at least a stowed position to a deployed position.

The UGV can also be comprised of a robotic arm. In such scenarios, the rotary joint used to control the rotation of the stabilizer flipper is also a joint of the robotic arm. Accordingly, the rotary joint can serve a dual purpose of function. If a robotic arm is included, the stabilizer flipper can be configured to pivot in at least one plane that is offset along the pivot axis relative to the robotic arm. Consequently, pivot motion of the stabilizer flipper is unobstructed by the robotic arm.

A UGV as described can include at least one motive element (such as a track) which is configured to facilitate movement of the UGV along a ground surface or working surface on which the UGV is disposed. As such, the motive element will comprise a ground engaging face configured to engage the ground or working surface. According to one aspect, the flipper contact surface is arranged so that it is substantially aligned with a plane defined by the ground engaging surface when the stabilizer flipper is in the deployed position. A vehicle chassis of the UGV can include an upper deck opposed from a ground facing bottom side. In such scenarios, the elongated length of the stabilizer flipper can be configured to extend across the upper deck when in the stowed position.

In some scenarios, the elongated length of the stabilizer flipper is advantageously contoured to allow the stabilizer flipper, when in the deployed position to extend a distance across the upper deck and around an outer periphery of the UGV without being obstructed by portions of the chassis. According to one aspect, a hook-shaped element can be disposed along a portion of the elongated length of the stabilizer flipper that is distal from the pivot axis. The hook-shaped element in such scenarios will include a concave section which defines an opening. The hook-shaped element is oriented so that this concave section faces toward the chassis when the stabilizer flipper is in the deployed position.

This disclosure also concerns a method for dynamically reorienting a stabilizer flipper in the above-described UGV having a robotic arm, where the vehicle chassis extends in a longitudinal direction from a vehicle rear to a vehicle front and in lateral directions from a vehicle centerline to two opposing lateral sides. The method involves determining a stabilization direction based on one or both of a position of a robotic arm relative to the vehicle chassis, and an activity of the robotic arm. The method further involves using an actuated rotatable joint to selectively rotate an elongated length of a stabilizer flipper about a rotation axis to align with the stabilization direction. The stabilization direction can be automatically selected to comprise any angle in an arc ranging from the at least one of the lateral directions to the longitudinal direction. For example, a computer processing element can be used to select the stabilization direction in accordance with the position of the robotic arm and/or an activity that the robotic arm is engaged in.

The method can further involve pivoting the stabilizer flipper about a pivot axis transverse to the rotation axis, between a stowed position and a deployed position in which the stabilizer flipper engages a surface on which the UGV is supported. In some scenarios, the stabilizer flipper can be automatically deployed responsive to the computer processing element when a need is identified for UGV chassis stabilization.

In a UGV described herein, the actuated rotatable joint can comprise a rotatable joint of the robotic arm. In such scenarios, the method can involve pivoting the stabilizer flipper in a plane offset from the robotic arm whereby pivot motion of the stabilizer flipper is unobstructed by the robotic arm. Further, a first and second leg of the stabilizer flipper can be spaced apart along the pivot axis on opposing sides of the robotic arm.

As noted above, the stabilization direction can be dynamically determined to most effectively allow the stabilization flipper to counteract a destabilizing force exerted on the vehicle chassis by the robotic arm. For example, a computer processor can automatically cause the stabilizer flipper to extend in the same direction as the robotic arm is extended when the robotic arm is used for lifting an object. Alternatively, the computer processor can automatically cause the stabilizer flipper to extend in an opposite direction as compared to the direction in which the robotic arm is extended when the robotic arm is used to fire a disruptor or other device that produces recoil. Further, the stabilization direction can be chosen or selected by the processing element to facilitate use of the stabilization flipper for transitioning the UGV which is overturned to an upright position. In such scenarios, one or more chassis orientation sensors can be provided in the UGV. Chassis orientation information can them be provided to the computer processing element to facilitate a determination of the optimal stabilization direction.

The method can further involve using the hook-shaped element included as part of the stabilizer flipper described herein to facilitate snagging of objects (especially objects which are relatively high compared to the vehicle chassis). Pivoting action of the stabilizer flipper can then be used to facilitate lifting of the chassis over an obstacle.

From the foregoing it will be understood that a UGV described herein can include an adaptive positioning system which is configured to selectively orient or align an elongated leg of the stabilizer flipper to extend in a stabilization direction, wherein the stabilization direction can range from at least the lateral direction to the longitudinal direction (defined with respect to the chassis). The adaptive positioning system will include at least one electronic control system or computer processor which is configured to dynamically determine the stabilization direction in response to at least one of a position of the robotic arm, and an anticipated force exerted on the robotic arm. In some scenarios, the adaptive positioning system can determine the stabilization direction based on input from one or more chassis orientation sensors (e.g., pitch, roll and yaw sensors). Consequently, the adaptive positioning system can selectively orient the at least one leg of the stabilizer flipper to align in a recovery direction selected to facilitate restoring the UGV to an upright position under conditions when the UGV has been overturned.

BRIEF DESCRIPTION OF THE DRAWINGS

This disclosure is facilitated by reference to the following drawing figures, in which like numerals represent like items throughout the figures, and in which.

DETAILED DESCRIPTION

It will be readily understood that the components of the systems and/or methods as generally described herein and illustrated in the appended figures could be arranged and designed in a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

Unmanned ground vehicles (UGVs) need to be able to perform a variety of different tasks and operations without becoming unstable and tipping over. Various conventional approaches have been applied to solve this problem. For example, to enhance stability some conventional UGVs have been equipped with deployable outriggers mounted to the chassis. Depending on configuration, deployable outriggers can potentially improve longitudinal (front to back) and/or lateral (side to side) stability. However, they do not improve mobility of stair climbing functions. These devices also add at least a moderate degree of complexity to a UGV as they usually involve one motor per outrigger.

Another approach to the stability problem involves motorized flippers. Motorized flippers are usually disposed at either the front or rear of the UGV chassis. These systems range from relatively simple (e.g., in the case of motorized flipper arms) to very complex configurations in which the flippers are provided with tracks. Motorized flippers can be useful for improving mobility, particularly with regard to stair climbing. Motorized flippers are also useful to improve the longitudinal (i.e., front to rear) stability of a UGV. However, these devices offer little or no help with lateral (side to side) stability.

Accordingly, there is disclosed herein a solution for adaptive stabilization of a UGV. The solution can adaptively facilitate improved lateral or longitudinal stability performance under a wide variety of different operating conditions and offers reduced complexity as compared to conventional arrangements. As a further advantage, the system offers the mobility benefit/functionality of motorized flippers to enable stair climbing.

Figure 1:
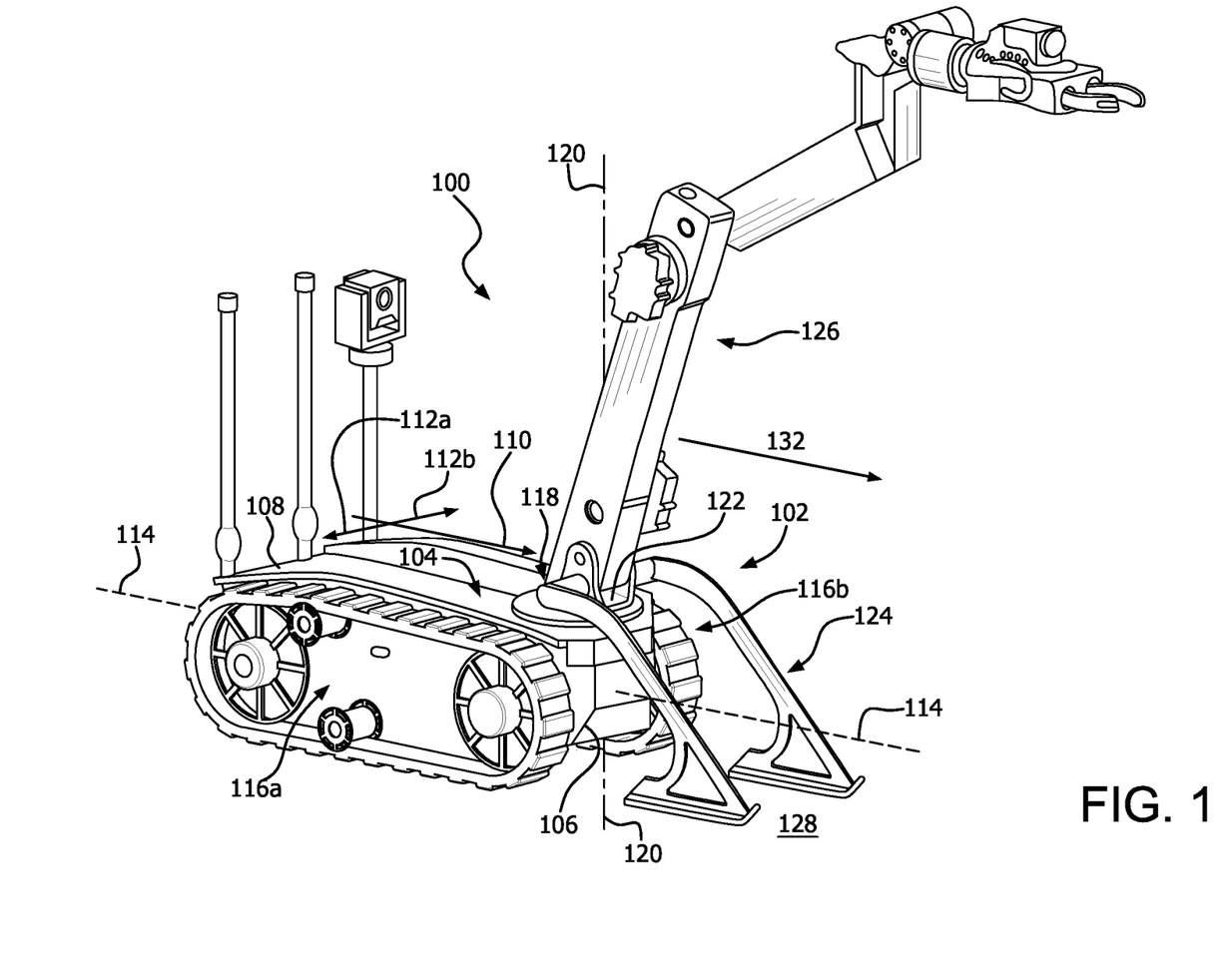
FIG. 1 is a drawing that is useful for understanding a UGV with a stabilizing flipper, in which the flipper is shown in a first position.
Figure 2:
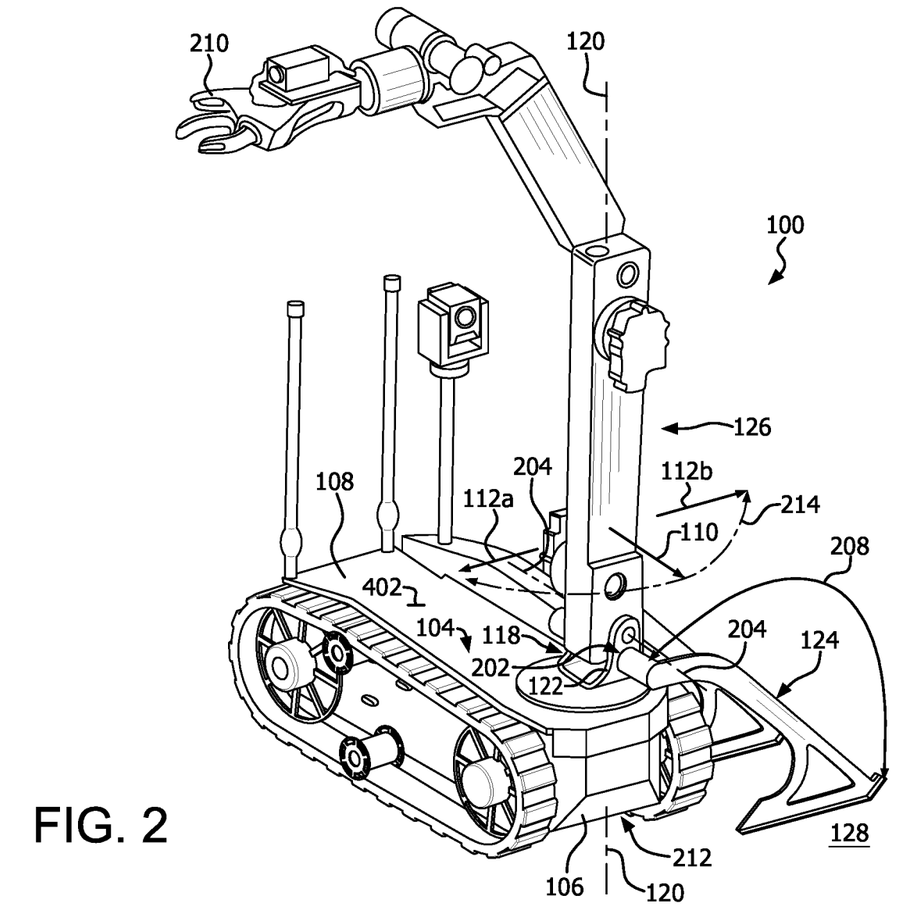
FIG. 2 is a drawing that is useful for understanding the UGV of FIG. 1, in which the flipper is shown in a second position rotated about a vertical axis relative to the first position.
Figure 3:
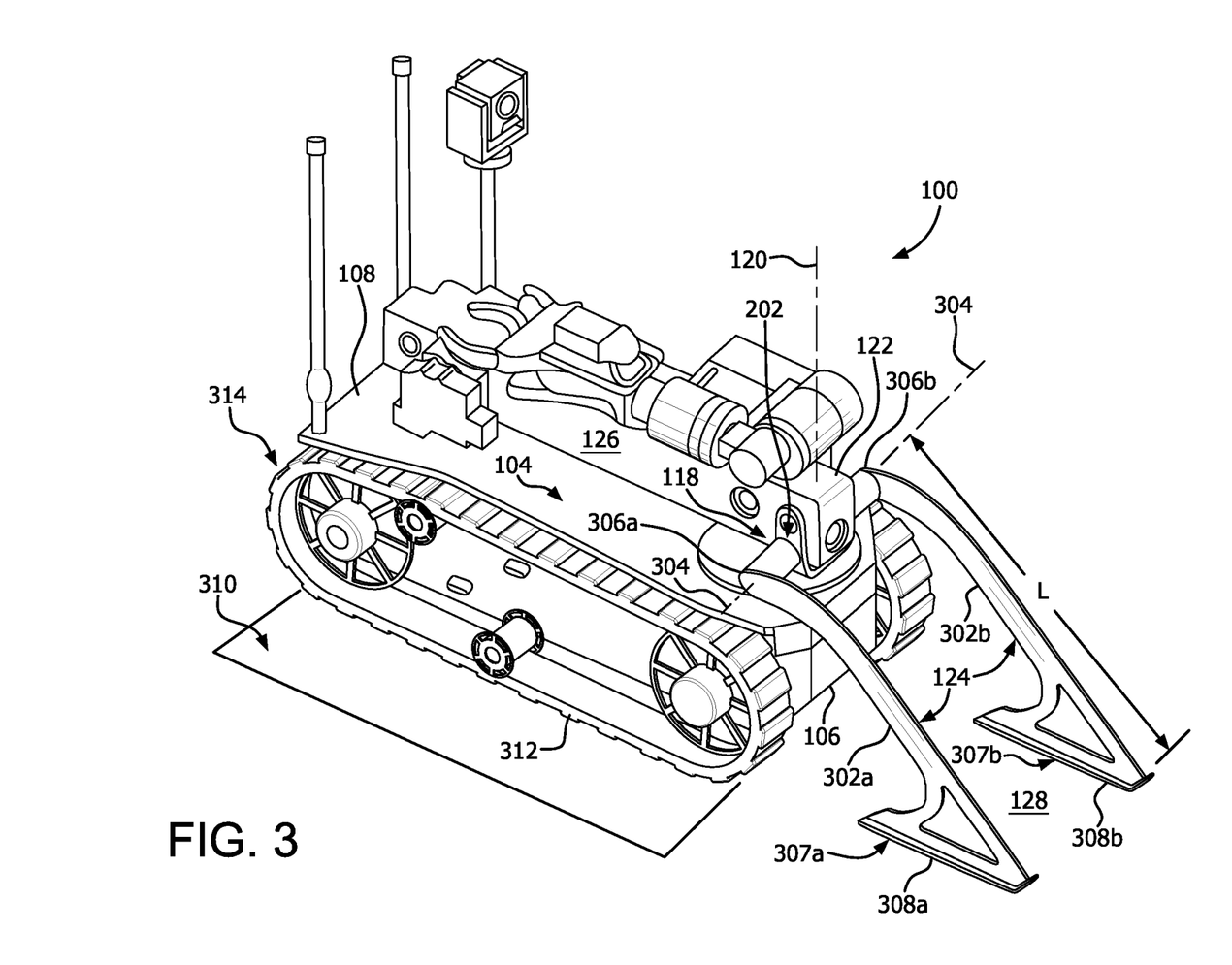
FIG. 3 is a drawing that is useful for understanding the UGV of FIG. 1, in which the stabilizing flipper is shown in a deployed position and a robotic arm is in a stowed position.

The solution involves a stabilizer flipper which is attached to an actuated rotary joint which is disposed on the UGV. The actuated rotary joint is arranged to have a predominantly vertical rotation axis. The rotation facilitated by this joint relative the UGV chassis is used to advantageously reorient the stabilizer flipper to facilitate optimal stabilization of the UGV under various different operating conditions. For simplicity and reduced expense, the rotary joint can in some scenarios be a rotary joint which is used to rotatably mount a robotic arm to the chassis of a UGV. In some scenarios the rotary joint can comprise one of the joints of the robotic arm. The stabilizer flipper can pivot between a stowed and deployed configuration. When stowed, the stabilizer flipper can be pivoted to extend across an upper deck of the UGV. When needed, the stabilizer flipper can be pivoted to a deployed configuration. Implementation of an adaptive flipper as described herein can advantageously require the addition to the UGV of only a single additional motor. The solution is described below in greater detail Shown in FIGS. 1-3 is a UGV 100 with an adaptive stabilizer system 102. The UGV is comprised of a vehicle chassis 104 which extends in a longitudinal direction from a vehicle front 106 to a vehicle rear 108 and in lateral directions from a vehicle centerline 114 to two opposing lateral sides 116a, 116b. A rotary joint 118 is mounted to the vehicle chassis. The rotary joint 118 has a rotary joint axis of rotation 120 that is aligned transverse to both the longitudinal direction 110 and the lateral directions 112a, 112b. The system also includes a rotary joint actuator (not shown in FIG. 1) which is responsive to at least one control signal. The rotary joint actuator is configured to cause a rotatable portion 122 of the rotary joint to rotate relative to the vehicle chassis about the rotary joint axis of rotation 120.

In some scenarios, a robotic arm 126 is mounted on or attached to the rotatable portion 122 of the rotary joint. As such, the rotary joint 118 can be understood as comprising a joint or a portion of a joint associated with the robotic arm. For example, the rotary joint 118 can be used to facilitate rotation of the robotic arm about rotary joint axis of rotation 120 so as to facilitate the various arm positions as shown in FIGS. 1-4. If the rotary joint 118 comprises a portion of a joint comprising a robotic arm then the joint can also be configured to facilitate other robotic arm motion. For example, in the scenario shown in FIGS. 1-4 the joint can be configured to also facilitate pivot action of the robotic arm about a pivot axis 204.

The adaptive stabilizer system 102 includes a stabilizer flipper 124 having an elongated length L. In some scenarios, the stabilizer flipper can be comprised of two legs 302a, 302 which traverse or extend the elongated length L of the stabilizer flipper 124. As shown in FIGS. 1-3, the stabilizer flipper 124 is attached to the rotatable portion 122. According to one aspect, the attachment to the rotatable portion 122 is facilitated by a pivot joint 202. As may be observed by comparing the position of the stabilizer flipper in FIGS. 1 and 2, a rotation of the rotatable portion 122 about the rotary joint axis of rotation 120 will result in a change of orientation of the stabilizer flipper relative to the chassis.

Figure 4:
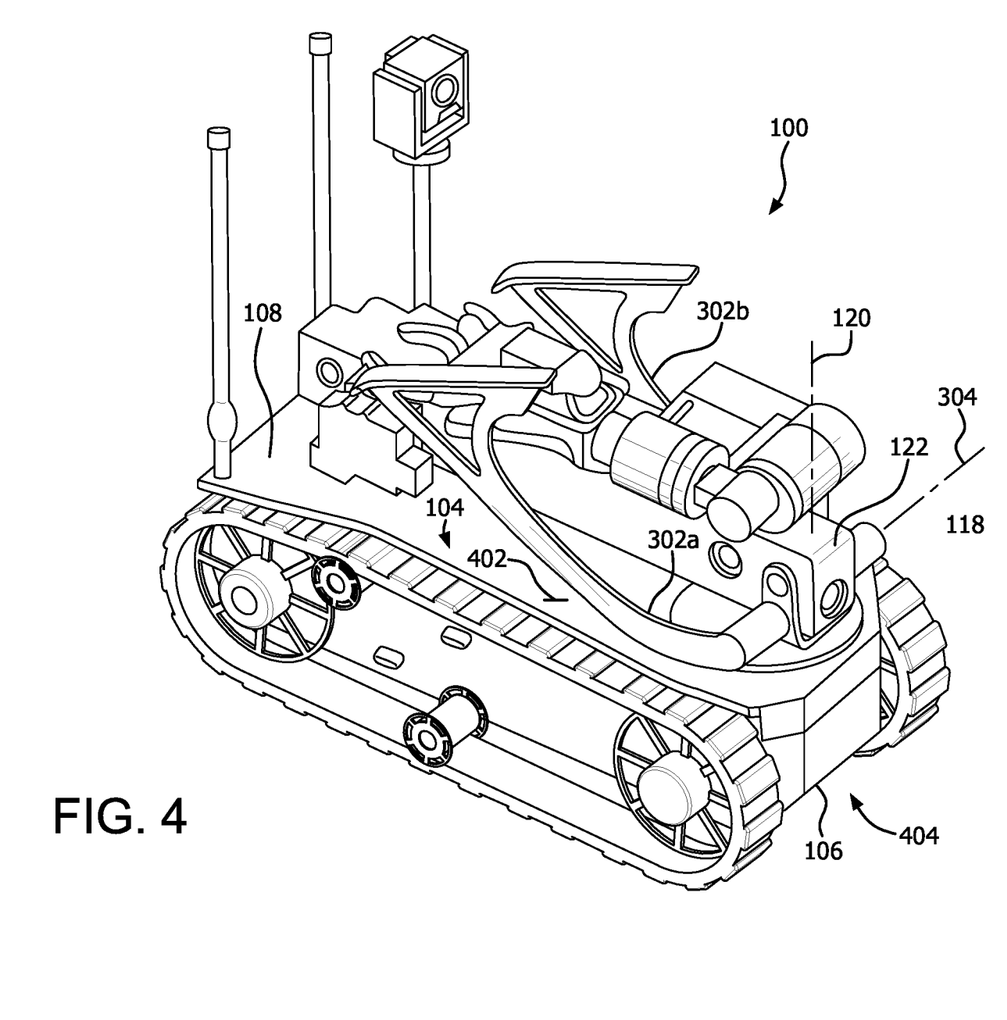
FIG. 4 is a drawing that is useful for understanding the UGV of FIG. 1, in which the robotic arm and the stabilizing flipper are both in a stowed position.

As best understood with reference to FIGS. 3 and 4, the pivot joint 202 is configured to facilitate a pivoting of the stabilizer flipper about a pivot joint axis of rotation 304. It can be observed in FIGS. 3 and 4 that the pivot joint axis of rotation is aligned transverse to the rotary joint rotation axis 120. As such, the stabilizer flipper can be configured to pivot through an arc 208 which defines at least one plane. As shown in FIG. 2, this pivot plane is offset along the pivot axis relative to the robotic arm 126. Accordingly, pivot motion of the stabilizer flipper can be arranged so that it is unobstructed by the robotic arm 126. In those scenarios wherein the first and second legs 302a, 302b form or define the elongated length L of the stabilizer flipper 124, the two legs can be advantageously disposed on opposing sides of the robotic arm as shown. In such scenarios, the first and second legs may be spaced apart a distance from each other along the pivot joint axis of rotation 304. In this way, the legs can move freely between a deployed position shown in FIGS. 1-3 and a stowed position as shown in FIG. 4.

As shown in FIG. 2, the vehicle chassis 104 can have an upper deck 402 which is opposed from a ground facing bottom side 404. The upper deck extends between the front and back of the vehicle and between the two opposing lateral sides. When the stabilizer flipper is in the stowed configuration, its elongated length can be positioned or pivoted to extend across such upper deck so that it does not interfere with vehicle movement or travel through confined spaces.

It can be observed in FIGS. 1-4 that the stabilizer flipper 124 is attached to the pivot joint 202 at a first end 306a, 306b of the stabilizer flipper, and has at least one foot 307a, 307b at an opposing second end. Each foot has a flipper contact surface 308a, 308b which is intended to engage a working surface or ground surface 128 on which the UGV is disposed. In this regard, at least a portion of the flipper contact surface(s) 308a, 308b can extend in a direction which is transverse to their respective leg 302a, 302b. In this regard it can be observed in FIGS. 3 and 5 that when the stabilizer flipper is in the deployed position shown in FIGS. 1-3 the flipper contact surface 308a, 308b can be positioned so that it is substantially aligned with a plane 310 defined by a ground engaging surface of the UGV. In some scenarios, the ground engaging surface as referenced herein can comprise a ground engaging face 312 of a track 314. As will be understood, the track 314 can comprise a portion of a motive element configured to facilitate movement of the vehicle along a ground surface.

Figure 5:
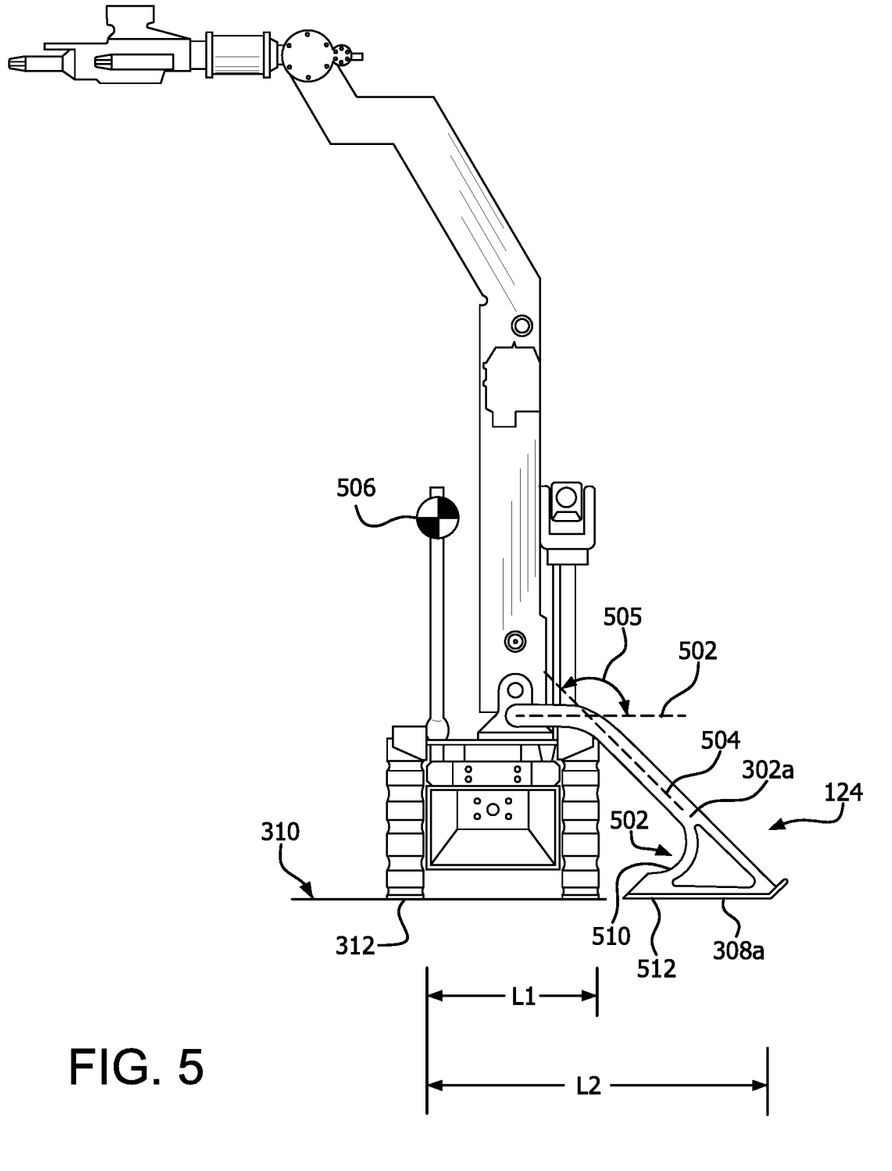
FIG. 5 is a drawing that is useful for understanding how the deployment of the stabilizing flipper to one side in the UGV of FIG. 1 can enhance UGV stability under conditions where the robotic arm is deployed in a lateral direction relative to the UGV chassis.

It can be observed in FIG. 5 that when the stabilizer flipper 124 is deployed, it can increase a size of a support base for robotic arm operations. For example, assume that the UGV in FIG. 5 has a center of gravity located at 506. By deploying the stabilizer flipper, the support base for the robotic arm (relative to the center of gravity can be increased from L1 to L2. Increasing the support base can improve the stability of the UGV.

The legs which define the elongated length of the stabilizer flipper 124 can be comprised of one or more rigid elements which have an elongated linear form. But in some scenarios it can be advantageous to instead configure the legs to have a contoured shape. For example, with reference to FIG. 5 it can be observed that in some scenarios a first portion of a leg 302a can extend along a first direction 502 and a second portion of the leg can extend along a second direction 504 which is not aligned with the first portion. As such an angle 505 can be defined between the first and second directions. For example, the angle 505 can be an obtuse angle as shown in FIG. 5. Such an arrangement can allow the stabilizer flipper, when in the deployed position, to extend across the upper deck and around an outer periphery of the UGV without obstruction, while ensuring that the foot 308a remains in relatively close proximity to the chassis.

Further, a portion of the stabilizer flipper that is distal from the pivot joint 202 can advantageously include a hook-shaped portion 508. The hook-shaped portion 508 can comprise a concave surface 510. The concave section is arranged so that an opening defined by the concave section faces toward the chassis. With a configuration as shown and described, the hook-shaped portion 508 can be helpful to facilitate advantageous use of the stabilizer flipper under conditions where the robot is required to traverse high obstacles (e.g. obstacles which are higher than the chassis 104). In such scenarios, the hook-shaped portion 508 can be used to help traverse the high obstacle by receiving or capturing a part of the obstacle in the concave surface 510 of the hook-shaped portion. As such, the stabilizer flipper can more effectively grab or snag the obstacle and use the hook to help drag the chassis up and over the obstacle. In some scenarios, the hook-shaped portion 502 can serve a dual purpose. For example, in addition to its snagging function, the hook can provide mechanical support for a heel 512 of each foot and its associated flipper contact surface 308*a*, 308*b*.

Figure 6:
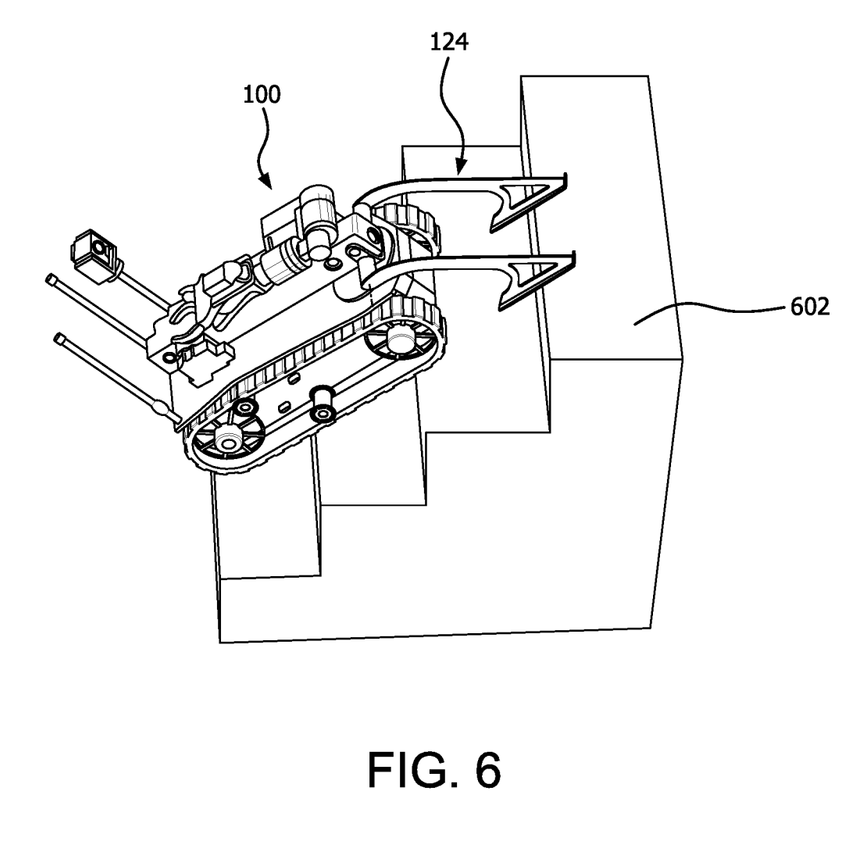
FIG. 6 is a drawing that is useful for understanding how the deployment of the stabilizing flipper can facilitate navigation of stairs.

It should be understood that the stabilizer flipper can be used for other purposes beyond just stabilizing the UGV in response to various robotic arm activities. For example, in a scenario shown in FIG. 6 a stabilization direction in which a stabilizer flipper 124 is deployed can be selected so as to assist the UGV 100 in traversing a man-made or natural terrain condition. In FIG. 6 the stabilizer flipper is being used to assist the UGV in traversing a stairway 602. Other scenarios are also possible in which the direction in which the stabilizer flipper is deployed can be selected to facilitate returning the UGV to an upright position under circumstances in which the UGV has been overturned.

In the solution described herein, the UGV 100 has a stabilizer flipper 124 which has one or more legs which are arranged to selectively engage a working surface (e.g., a ground surface) on which the UGV is supported. More particularly, the stabilizer flipper 124 is arranged to selectively engage a ground surface 128 disposed in various directions around a periphery of the vehicle chassis to enhance vehicle stability under various operating conditions. As such, the UGV has an adaptive positioning system which includes rotary joint 118 that is configured to selectively orient or align an elongated leg of the stabilizer flipper to extend in a desired stabilization direction. It can be observed in FIGS. 1-3 that this stabilization direction can range in an arc 214 from the longitudinal direction 110 to at least one of the first and second lateral directions 112*a*, 112*b*.

Figure 7:
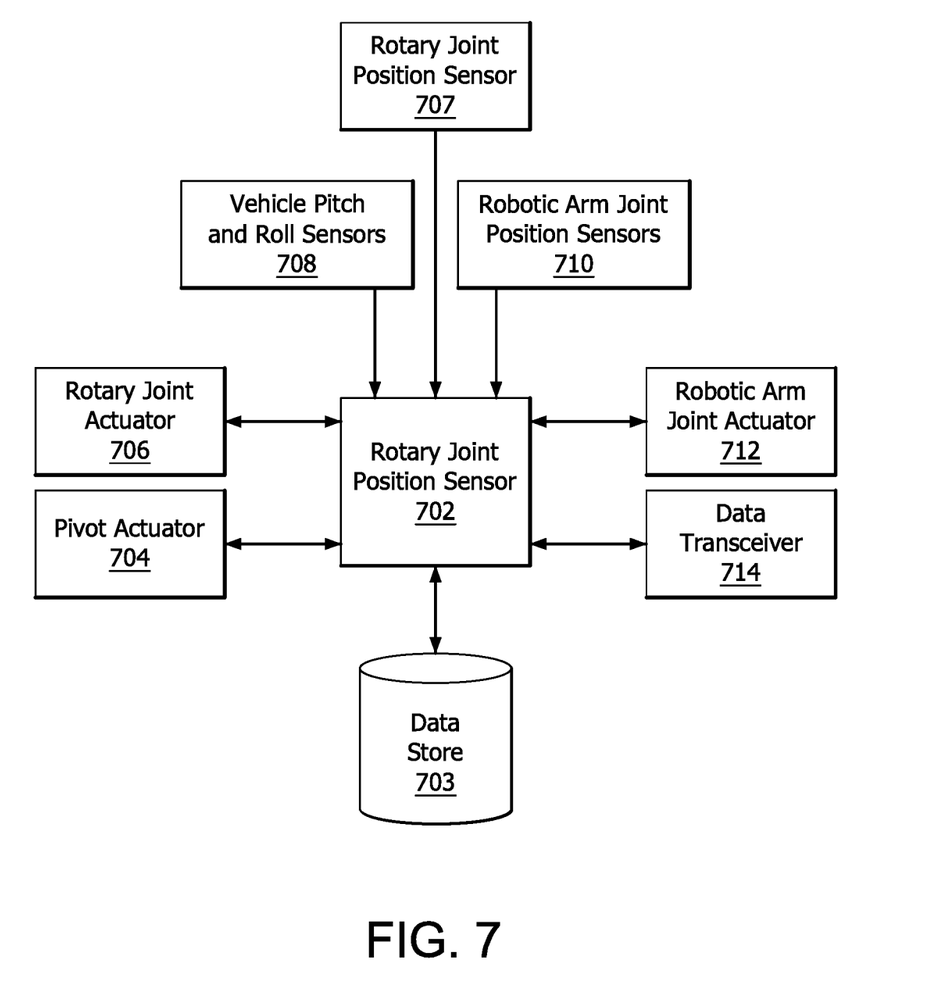
FIG. 7 is a block diagram that is useful for understanding a control system which facilitates operation of an adaptive UGV stabilization system.

Referring now to FIG. 7 an adaptive positioning system as described herein can advantageously include at least one electronic control system 702. The electronic control system can be comprised of a processing element such as a microprocessor, microcontroller, programmable logic array (PLA) or an application specific integrated circuit (ASIC). Applications that can include the control system broadly include a variety of electronic and computer systems. In some scenarios, certain functions can be implemented in two or more specific interconnected hardware modules or devices with related control and data signals communicated between and through the modules, or as portions of an application-specific integrated circuit. Thus, the exemplary system is applicable to software, firmware, and hardware implementations.

The electronic control system can have access to a data store 703 which can contain one more sets of instructions and/or look-up tables to facilitate operation of the control system. The adaptive positioning system can further include one or more of a pivot actuator 704, a rotary joint actuator 706, vehicle pitch and roll sensors 708, and robotic arm joint position sensors 710. In some scenarios, the electronic control system 702 can also communicate with robotic arm joint actuators 712 and a data transceiver 714.

Pivot actuator 704 is under control of the control system 702 and can include any suitable type of actuator (e.g. a motor) which is capable of causing the stabilizer flipper to pivot or rotate in the pivot joint 202 between a stowed position (e.g. as shown in FIG. 4) and a deployed position (e.g., as shown in FIGS. 1-3). The rotary joint actuator can likewise be any suitable type of actuator or motor. The rotary joint actuator is responsive to control signals provided by the control system 702 to cause a rotation movement of a rotatable portion 122 of rotary joint 118. Vehicle pitch and roll sensors 708 provide vehicle pitch and roll angle information to the control system. A rotary joint position sensor 709 can provide information to the control system concerning a rotation position of a rotatable portion 122. Robotic arm joint position sensors 710 provide information to the control system regarding a position of one or more joints of a robotic arm 126. In some scenarios disclosed herein the rotary joint position sensor 710 can be included in the robotic arm joint position sensors 712. Data transceiver 714 can be provided to facilitate wired or wireless communications between the control system 702 and a UGV remote operator control unit (not shown).

According to one aspect, the control system 702 is configured to dynamically determine a stabilization direction in which the stabilizer flipper 124 is to be deployed. For example, the stabilization direction can be determined in response to at least one of a position of the robotic arm (as determined by the joint position sensors). In other scenarios, the stabilization direction can be determined based on the position of the robotic arm and an anticipated force exerted on the robotic arm.

For example, in FIG. 1, the stabilizer flipper is shown deployed in a stabilization direction 132 aligned with longitudinal direction 110 when the robotic arm 126 is being used for lifting. In FIG. 2, the stabilizer flipper may need to be deployed in a different stabilization direction aligned with lateral direction 112*a* when the robotic arm is being used for lifting. In other scenarios, the stabilizer flipper in FIG. 2 might need to be deployed in alignment with a second, different, direction (e.g., lateral direction 112*b*) when the robotic arm is being used for supporting a recoil producing device, such as a disruptor or a projectile weapon. So the stabilizer flipper can be extended in a stabilization direction which is toward a gripper 210 of the robotic arm 126 when the robotic arm is used for lifting an object, and can be extended in an direction away from a gripper 210 of a robotic arm when the robotic arm is used to fire a disruptor (not shown) or other device that produces recoil. In other words, the rotary joint actuator and the pivot actuator can be controlled to selectively cause the stabilizer flipper to be extended in a direction transverse to the rotary joint axis which allows the stabilizer flipper to most effectively counteract a destabilizing force exerted on the vehicle chassis by the robotic arm.

In addition to performing functions pertaining to chassis stabilization, an adaptive positioning system for the stabilizer flipper can serve other purposes. For example, the system can be used to facilitate transitioning of the UGV to an upright position after the vehicle has been overturned. More particularly, the control system 702 can be configured to selectively orient the legs 302*a*, 302*b* of the stabilizer flipper to align in a recovery direction selected to facilitate restoring the UGV to an upright position under conditions when the UGV has been overturned. Thereafter, the pivot actuator can be operated to urge the UGV back to its upright state.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with a particular implementation is included in at least one embodiment. Thus, discussions of the features and advantages, and similar language, throughout the specification may, but do not necessarily, refer to the same embodiment.

Furthermore, the described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. An unmanned ground vehicle (UGV), comprising
a vehicle chassis which extends in a longitudinal direction from a vehicle rear to a vehicle front and in lateral directions from a vehicle centerline to two opposing lateral sides;
a rotary joint mounted to the vehicle chassis and having a rotary joint axis of rotation aligned transverse to both the longitudinal direction and the lateral directions;
a rotary joint actuator responsive to at least one control signal and configured to cause a rotatable portion of the rotary joint to rotate relative to the vehicle chassis about the rotary joint axis of rotation;
a robotic arm coupled to the rotary joint; and
a stabilizer flipper having an elongated length and attached to the rotatable portion via a pivot joint;
wherein rotation of the rotatable portion about the rotary joint axis of rotation results in a change of orientation of the stabilizer flipper relative to the chassis; and
wherein the pivot joint is configured to facilitate a pivoting of the stabilizer flipper about a pivot joint axis of rotation independent of the robotic arm, the pivot joint axis of rotation being aligned transverse to the rotatory joint rotation axis.

2. The UGV according to claim 1, wherein the stabilizer flipper is attached to the pivot joint at a first end of the stabilizer flipper, and a foot which defines a flipper contact surface is disposed at a second end of the stabilizer flipper, opposed from the first end.

3. The UGV according to claim 2, further comprising a flipper actuator responsive to at least one control signal to cause the stabilizer flipper to pivot about the pivot joint axis from at least a stowed position to a deployed position.

4. The UGV according to claim 3, further comprising:
at least one motive element configured to move the UGV along a ground surface and including a ground engaging face configured to engage the ground surface; and
wherein the flipper contact surface is substantially aligned with a plane defined by the ground engaging face when the stabilizer flipper is in the deployed position.

5. The UGV according to claim 3, wherein the vehicle chassis has an upper deck opposed from a ground facing bottom side and the elongated length of the stabilizer flipper is configured to extend across the upper deck when in the stowed position.

6. The UGV according to claim 5, wherein the elongated length of the stabilizer flipper is contoured to allow the stabilizer flipper, when in the deployed position to extend across the upper deck and around an outer periphery of the UGV without obstruction.

7. An unmanned ground vehicle (UGV), comprising
a vehicle chassis which extends in a longitudinal direction from a vehicle rear to a vehicle front and in lateral directions from a vehicle centerline to two opposing lateral sides;
a rotary joint mounted to the vehicle chassis and having a rotary joint axis of rotation aligned transverse to both the longitudinal direction and the lateral directions;
a rotary joint actuator responsive to at least one control signal and configured to cause a rotatable portion of the rotary joint to rotate relative to the vehicle chassis about the rotary joint axis of rotation; and
a stabilizer flipper having an elongated length and attached to the rotatable portion, wherein rotation of the rotatable portion about the rotary joint axis of rotation results in a change of orientation of the stabilizer flipper relative to the chassis;
wherein the stabilizer flipper is attached to the rotatable portion by a pivot joint which is configured to facilitate a pivoting of the stabilizer flipper about a pivot joint axis of rotation aligned transverse to the rotary joint rotation axis; and
wherein the UGV is further comprised of a robotic arm and wherein the rotary joint is also a joint of the robotic arm.

8. The UGV according to claim 7, wherein the stabilizer flipper is configured to pivot in at least one plane that is offset along the pivot joint axis relative to the robotic arm, whereby pivot motion of the stabilizer flipper is unobstructed by the robotic arm.

9. The UGV according to claim 8, wherein the elongated length of the stabilizer flipper is traversed by a first leg and a second leg which are disposed on opposing sides of the robotic arm.

10. An unmanned ground vehicle (UGV), comprising
a vehicle chassis which extends in a longitudinal direction from a vehicle rear to a vehicle front and in lateral directions from a vehicle centerline to two opposing lateral sides;
a rotary joint mounted to the vehicle chassis and having a rotary joint axis of rotation aligned transverse to both the longitudinal direction and the lateral directions;
a rotary joint actuator responsive to at least one control signal and configured to cause a rotatable portion of the rotary joint to rotate relative to the vehicle chassis about the rotary joint axis of rotation;
a stabilizer flipper having an elongated length and attached to the rotatable portion, wherein rotation of the rotatable portion about the rotary joint axis of rotation results in a change of orientation of the stabilizer flipper relative to the chassis; and a hook-shaped element disposed along a portion of the elongated length of the stabilizer flipper that is distal from a pivot axis, the hook-shaped element including a concave section which defines an opening which faces toward the chassis when the stabilizer flipper is in a deployed position.

11. A method for dynamically reorienting a stabilizer flipper in an unmanned ground vehicle (UGV) having a robotic arm, comprising:
providing a vehicle chassis extending in a longitudinal direction from a vehicle rear to a vehicle front and in lateral directions from a vehicle centerline to two opposing lateral sides;
determining a stabilization direction based on at least one of a position of a robotic arm relative to the vehicle chassis, and an activity of the robotic arm;
using a single actuated rotatable joint to concurrently rotate the robotic arm and an elongated length of the stabilizer flipper about a common rotation axis until the elongated length of the stabilizer flipper is aligned with the stabilization direction, wherein the stabilization direction is selected to comprise any angle in an arc ranging from the at least one of the lateral directions to the longitudinal direction; and
pivoting the stabilizer flipper about a pivot axis independent of the robotic arm, the pivot axis being transverse to the rotation axis.

12. The method according to claim 11, wherein the stabilizer flipper is pivoted about the pivot axis between a stowed position and a deployed position in which the stabilizer flipper engages a surface on which the UGV is supported.

13. A method for dynamically reorienting a stabilizer flipper in an unmanned ground vehicle (UGV) having a robotic arm, comprising:
providing a vehicle chassis extending in a longitudinal direction from a vehicle rear to a vehicle front and in lateral directions from a vehicle centerline to two opposing lateral sides;
determining a stabilization direction based on at least one of a position of a robotic arm relative to the vehicle chassis, and an activity of the robotic arm;
using an actuated rotatable joint to selectively rotate an elongated length of a stabilizer flipper about a rotation axis to align with the stabilization direction, wherein the stabilization direction is selected to comprise any angle in an arc ranging from the at least one of the lateral directions to the longitudinal direction;
pivoting the stabilizer flipper about a pivot axis transverse to the rotation axis, between a stowed position and a deployed position in which the stabilizer flipper engages a surface on which the UGV is supported; and
selecting the actuated rotatable joint to comprise a rotatable joint of the robotic arm.

14. The method according to claim 13, further pivoting the stabilizer flipper in a plane offset from the robotic arm whereby pivot motion of the stabilizer flipper is unobstructed by the robotic arm.

15. The method according to claim 14, further comprising providing a first and second leg of the stabilizer flipper spaced apart along the pivot axis on opposing sides of the robotic arm.

16. The method according to claim 13, wherein the stabilization direction is dynamically determined to most effectively allow the stabilization flipper to counteract a destabilizing force exerted on the vehicle chassis by the robotic arm.

17. The method according to claim 16, further comprising extending the stabilizer flipper in the same direction as the robotic arm is extended when the robotic arm is used for lifting an object.

18. The method according to claim 16, further comprising extending the stabilizer flipper in an opposite direction as compared to the direction in which the robotic arm is extended when the robotic arm is used to fire a disruptor or other device that produces recoil.

19. A method for dynamically reorienting a stabilizer flipper in an unmanned ground vehicle (UGV) having a robotic arm, comprising:
providing a vehicle chassis extending in a longitudinal direction from a vehicle rear to a vehicle front and in lateral directions from a vehicle centerline to two opposing lateral sides;
determining a stabilization direction based on at least one of a position of a robotic arm relative to the vehicle chassis, and an activity of the robotic arm; and
using an actuated rotatable joint to selectively rotate an elongated length of a stabilizer flipper about a rotation axis to align with the stabilization direction, wherein the stabilization direction is selected to comprise any angle in an arc ranging from the at least one of the lateral directions to the longitudinal direction;
wherein the stabilization direction is chosen to facilitate use of the stabilization flipper for transitioning the UGV which is overturned to an upright position.

20. A method for dynamically reorienting a stabilizer flipper in an unmanned ground vehicle (UGV) having a robotic arm, comprising:
providing a vehicle chassis extending in a longitudinal direction from a vehicle rear to a vehicle front and in lateral directions from a vehicle centerline to two opposing lateral sides;
determining a stabilization direction based on at least one of a position of a robotic arm relative to the vehicle chassis, and an activity of the robotic arm; and
using an actuated rotatable joint to selectively rotate an elongated length of a stabilizer flipper about a rotation axis to align with the stabilization direction, wherein the stabilization direction is selected to comprise any angle in an arc ranging from the at least one of the lateral directions to the longitudinal direction; and
using a hook-shaped element disposed along a portion of the elongated length of the stabilizer flipper that is distal from the rotation axis to facilitate snagging of objects, and then pivoting the stabilizer flipper to facilitate lifting of the chassis over an obstacle.

21. An unmanned ground vehicle (UGV), comprising
a vehicle chassis extending in a longitudinal direction from a vehicle rear to a vehicle front, and in a lateral direction from a first lateral side to a second lateral side;
a robotic arm mounted to the vehicle chassis;
a stabilizer flipper configured to selectively engage a working surface on which the UGV is supported and located beyond a periphery of the vehicle chassis; and
an adaptive positioning system configured to selectively orient or align an elongated leg of the stabilizer flipper to extend in a stabilization direction, wherein the stabilization direction can range from at least the lateral direction to the longitudinal direction;
wherein the adaptive positioning system includes at least one electronic control system which is configured to dynamically determine the stabilization direction in response to at least one of a position of the robotic arm, and an anticipated force exerted on the robotic arm;

wherein the adaptive positioning system includes at least one actuated rotary joint having a rotation axis, being a shared joint with the robotic arm, and being configured to facilitate selectively varying the stabilization direction; and wherein the stabilizer flipper is pivoted independently of the robotic arm about a pivot axis transverse to the rotation axis from a stowed position to a deployed position.

22. The UGV according to claim 21, wherein the stabilization direction is selected to assist the UGV in traversing a man-made or natural terrain condition.

23. An unmanned ground vehicle (UGV), comprising
a vehicle chassis extending in a longitudinal direction from a vehicle rear to a vehicle front, and in a lateral direction from a first lateral side to a second lateral side;
a robotic arm mounted to the vehicle chassis;
a stabilizer flipper configured to selectively engage a working surface on which the UGV is supported and located beyond a periphery of the vehicle chassis;
an adaptive positioning system configured to selectively orient or align an elongated leg of the stabilizer flipper to extend in a stabilization direction, wherein the stabilization direction can range from at least the lateral direction to the longitudinal direction;
wherein the adaptive positioning system includes at least one electronic control system which is configured to dynamically determine the stabilization direction in response to at least one of a position of the robotic arm, and an anticipated force exerted on the robotic arm; and
wherein the adaptive positioning system is responsive to the electronic control system to selectively orient the at least one leg of the stabilizer flipper to align in a recovery direction selected to facilitate restoring the UGV to an upright position under conditions when the UGV has been overturned.

24. An unmanned ground vehicle (UGV), comprising
a vehicle chassis extending in a longitudinal direction from a vehicle rear to a vehicle front, and in a lateral direction from a first lateral side to a second lateral side;
a robotic arm mounted to the vehicle chassis;
a stabilizer flipper configured to selectively engage a working surface on which the UGV is supported and located beyond a periphery of the vehicle chassis; and
an adaptive positioning system configured to selectively orient or align an elongated leg of the stabilizer flipper to extend in a stabilization direction, wherein the stabilization direction can range from at least the lateral direction to the longitudinal direction;
wherein the adaptive positioning system includes at least one electronic control system which is configured to dynamically determine the stabilization direction in response to at least one of a position of the robotic arm, and an anticipated force exerted on the robotic arm; and
wherein the adaptive positioning system comprises at least one actuated rotary joint that is a shared joint of the robotic arm and configured to facilitate selectively varying the stabilization direction.

* * * * *